United States Patent [19]
Oishi

[11] Patent Number: 5,724,217
[45] Date of Patent: Mar. 3, 1998

[54] MAGNETIC DISK CARTRIDGE WITH SHUTTER SPRING ENGAGING PORTION AND GUIDE PROJECTION

[75] Inventor: Kengo Oishi, Kanagawa-ken, Japan

[73] Assignees: Fuji Photo Film Co., Tokyo, Japan; Iomega Corporation, Roy, Utah

[21] Appl. No.: 704,952

[22] Filed: Aug. 26, 1996

[51] Int. Cl.[6] .................................................. G11B 23/03
[52] U.S. Cl. ................................................... 360/133
[58] Field of Search ........................................... 360/133

[56] References Cited

U.S. PATENT DOCUMENTS 4,714,973  12/1987  Kato ........................................ 360/133
4,717,981  1/1988  Nigam ..................................... 360/133

Primary Examiner—A. J. Heinz
Attorney, Agent, or Firm—Sughrue, Mion, Zinn, Macpeak & Seas, PLLC

[57] ABSTRACT

A magnetic disk cartridge has a magnetic head access opening formed in one side surface of a flat cassette shell having a top surface, a bottom surface and side surfaces. A shutter member provided to be slidable on the cassette shell for opening and closing the magnetic head access opening is constituted as a sectionally U-shaped member formed by an upper wing, a shutter section having a window and a lower wing that are interconnected and extend respectively along the top surface, one side surface and the bottom surface. A shutter closing spring is provided for biasing the shutter member in the closing direction. The shutter section of the shutter member is provided at a lateral end portion thereof with a spring engaging portion for engaging one end of the shutter closing spring and between the spring engaging portion and the shutter window with at least one guide projection projecting toward the one side surface. The structure eliminates the problem of powder being produced owing to abrasion of the cassette shell because of unbalanced biasing of the shutter member by the shutter closing spring and ensures smooth sliding of the shutter member at all times.

3 Claims, 3 Drawing Sheets

MAGNETIC DISK CARTRIDGE WITH SHUTTER SPRING ENGAGING PORTION AND GUIDE PROJECTION

BACKGROUND OF THE INVENTION

1. Field of the Invention

The present invention relates to a magnetic disk cartridge, more particularly to an improved structure of a shutter for opening and closing a magnetic head access opening in a magnetic disk cartridge having a rotatable magnetic disk encased in a cassette shell.

2. Description of the Related Art

A magnetic disk cartridge comprises a magnetic disk for magnetically recording analog and/or digital signals rotatably encased in a thin cassette shell. The cassette shell is formed in the shape of a flat prism (substantially a hexahedron) with a top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter member for preventing invasion of dust and the like when the magnetic disk cartridge is not in use.

The magnetic head access opening of the prior art magnetic disk cartridge is a slender opening of substantially rectangular shape formed in the top and bottom surfaces of the cassette shell to extend in the radial direction of the magnetic disk. The shutter member for opening/closing the magnetic head access opening is a piece of thin sheet metal of U-shaped section which extends along both the top and bottom surfaces of the cassette shell and also over the side surface between them.

However, it is not absolutely necessary for the magnetic head access opening to be formed in the top and bottom surfaces of the cassette shell to extend in the radial direction of the magnetic disk. Specifically, it can be provided at any location so long as it enables the magnetic heads to be brought in contact with, or close to, the opposite surfaces of the magnetic disk over the full radius thereof from the exterior. The opening is preferably as small as possible so as to minimize invasion of dust into the cartridge. The ability to fabricate smaller magnetic heads has afforded greater freedom in the positioning and sizing of the magnetic head access opening and has even made it possible to realize the desired small magnetic head access opening by providing the opening only in a side surface rather than in the top and/or bottom surface. This can be achieved by forming a narrow side surface of the cassette shell with a magnetic head access opening of a size enabling access to the opposite surfaces of the magnetic disk from the exterior and inserting/withdrawing thin, arm-shaped pickups having tiny magnetic heads attached at their tips through this hole to conduct recording and reproduction while moving the pickups in the radial direction of the magnetic disk.

Such a magnetic disk cartridge having the magnetic head access opening formed in one side surface can accommodate a high-density, high-capacity magnetic disk. Such a magnetic disk requires a high data transfer rate. Like the conventional hard disk, therefore, it is adapted to conduct recording and reproducing while being rotated at a high speed.

Any foreign matter adhering to the surface of such a high-speed magnetic disk is liable to collide at high speed with the associated magnetic head during recording or reproducing since these operations are conducted with the magnetic head positioned close to the magnetic disk surface. As a result, the magnetic head may be damaged and the recording and reproducing performance degraded. To avert this possibility, it is necessary to prevent the invasion of foreign matter by improving the sealing performance of the cassette shell and to suppress generation of dust and the like from the cassette shell itself.

Dust is generated from the cassette shell itself mainly in the form of powder (shavings) produced when the shutter member rubs on and abrades the cassette shell locally during opening and closing.

The shutter member for opening and closing this type of magnetic head access opening has, as interconnected, an upper wing, a lower wing and a shutter section extending along the top and bottom surfaces and one side surface of the cassette shell, respectively, and the shutter section is provided with a window for opening the magnetic head access opening. A shutter closing spring is disposed inside the shutter section with one end engaged with the shutter member to urge it in the closing direction so that the magnetic head access opening is always closed when the magnetic disk cartridge is not in use (is in storage).

Since the shutter member is required to slide smoothly relative to the cassette shell during opening and closing, the inner height of the shutter member has to be slightly larger than the thickness of the shutter fitting portion of the cassette shell so as to provide a certain amount of clearance between the shutter member and the cassette shell. This clearance imparts play to the shutter member. Owing to this play, the shutter member tends to tilt so that its lateral edges contact the cassette shell during sliding. This contact between the stiff sheet metal of the shutter member and the plastic material of the cassette shell is liable to lead to abrasion of the cassette shell by the corner portions of the shutter member.

A further problem is caused by the provision of the shutter closing spring. The action of the biasing force of this spring is hard to maintain in good balance. In addition, the spring engaging portion of the shutter member which engages with one end of the shutter closing spring is provided on the shutter section extending along one side surface of the cassette shell. The side surface of the cassette shell is therefore formed with a slit portion for passage of the spring engaging portion and the one end of the shutter closing spring. Because of this configuration, the slit portion is likely to be abraded by the spring engaging portion and/or the end of the shutter closing spring sliding in contact therewith.

Since the powder owing to the abrasive action of the sliding shutter member is generated in the vicinity of the magnetic head access opening, it is likely to find its way inside the cassette shell through the magnetic head access opening, stick to the magnetic disk, and then transfer and stick to the magnetic heads where it causes dropout and other problems that degrade the recording and reproducing performance.

SUMMARY OF THE INVENTION

The object of this invention is to overcome the aforesaid problems by providing a magnetic disk cartridge wherein local contact of the shutter member with the cassette shell during sliding of the shutter member is prevented to enable opening and closing of the magnetic head access opening by sliding the shutter member along the cassette shell while maintaining an optimum state of abrasion-free contact therewith.

For achieving this object, the present invention provides a magnetic disk cartridge comprising a cassette shell formed as a flat prism with a top surface slightly larger than a magnetic disk encased in the cassette shell, a bottom surface of approximately the same shape as, and parallel to, the top surface, and narrow side surfaces extending between outer peripheral edges of the top and bottom surfaces, a magnetic head access opening formed in one side surface of the cassette shell for enabling magnetic reproducing and recording heads to be brought in contact with, or close to, opposite surfaces of the magnetic disk from the exterior, a shutter member constituted as a sectionally U-shaped sheet member formed of an upper wing, a shutter section with a shutter window and a lower wing that are interconnected and extend respectively along said top, one side and bottom surfaces, and a shutter closing spring for biasing the shutter member in the closing direction, wherein the shutter member is provided on the cassette shell to be slidable along said surfaces for enabling the shutter window of the shutter section to open and close the magnetic head access opening, and the shutter section of the shutter member is provided at a lateral end portion thereof with a spring engaging portion for engaging one end of the shutter closing spring and between the spring engaging portion and the shutter window with at least one guide projection projecting toward the one side surface.

Preferably, the magnetic disk cartridge further comprises a slit portion formed in the one side surface of the cassette shell for passage of the shutter closing spring or the spring engaging portion and the tip of the guide projection slides in the slit portion. Further, the guide projection preferably has a circular, elliptical or rectangular shape as viewed in a section taken in a plane parallel to the one side surface of the cassette shell.

DESCRIPTION OF THE PREFERRED EMBODIMENT

Figure 1:
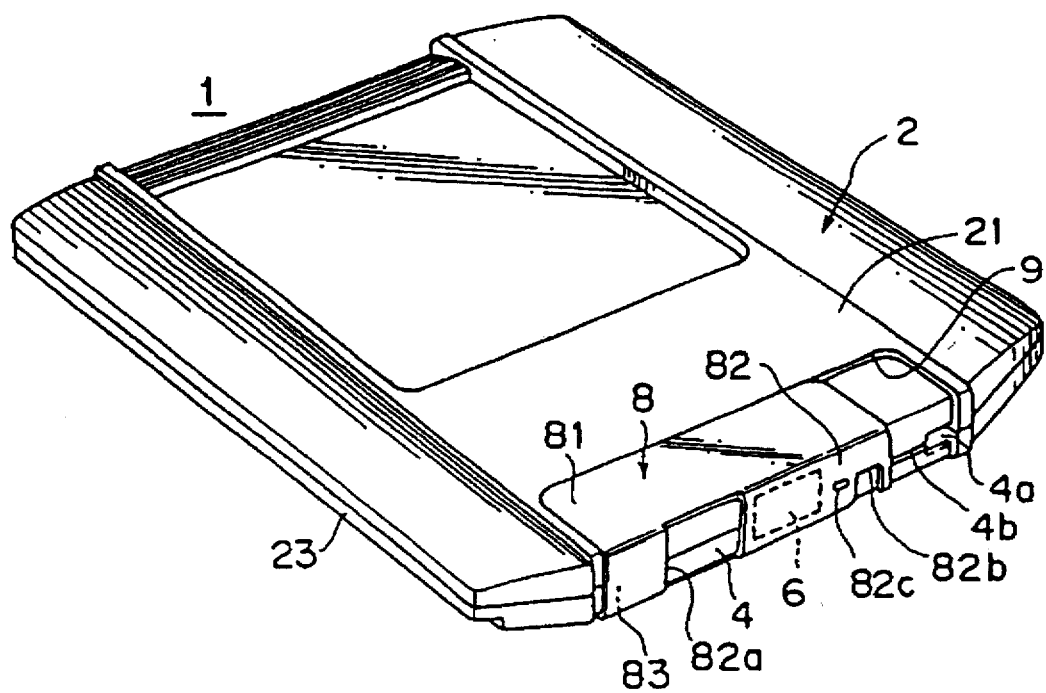
FIG. 1 is a top perspective view of a magnetic disk cartridge which is an embodiment of the invention shown with its shutter member closed.
Figure 2:
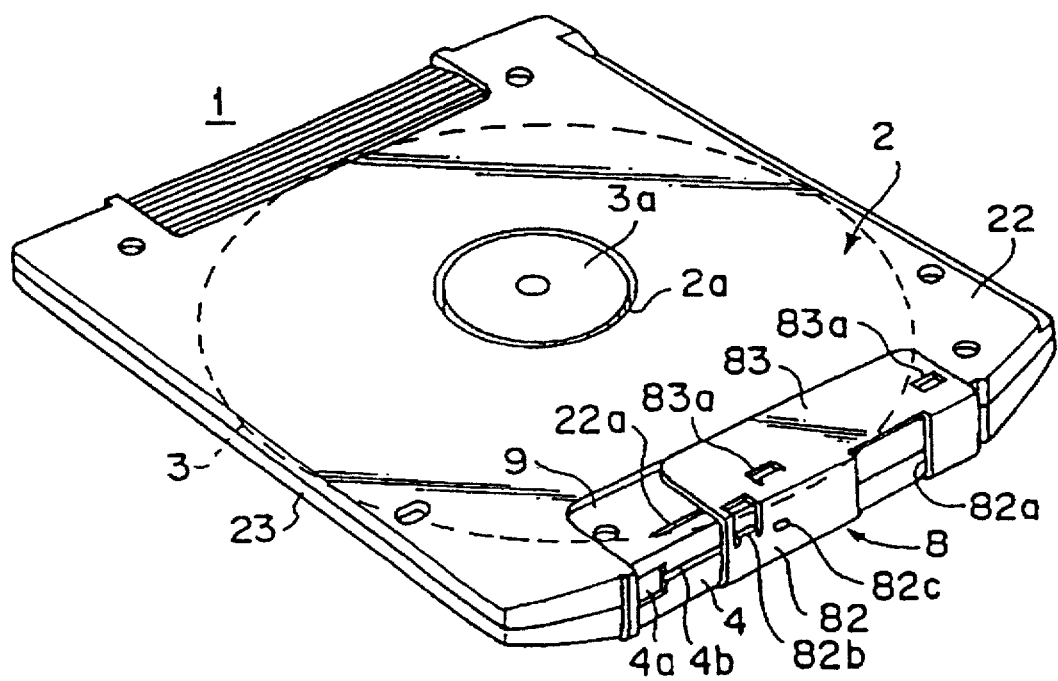
FIG. 2 is a bottom perspective view of the magnetic disk cartridge of FIG. 1 shown with its shutter member closed.
Figure 3:
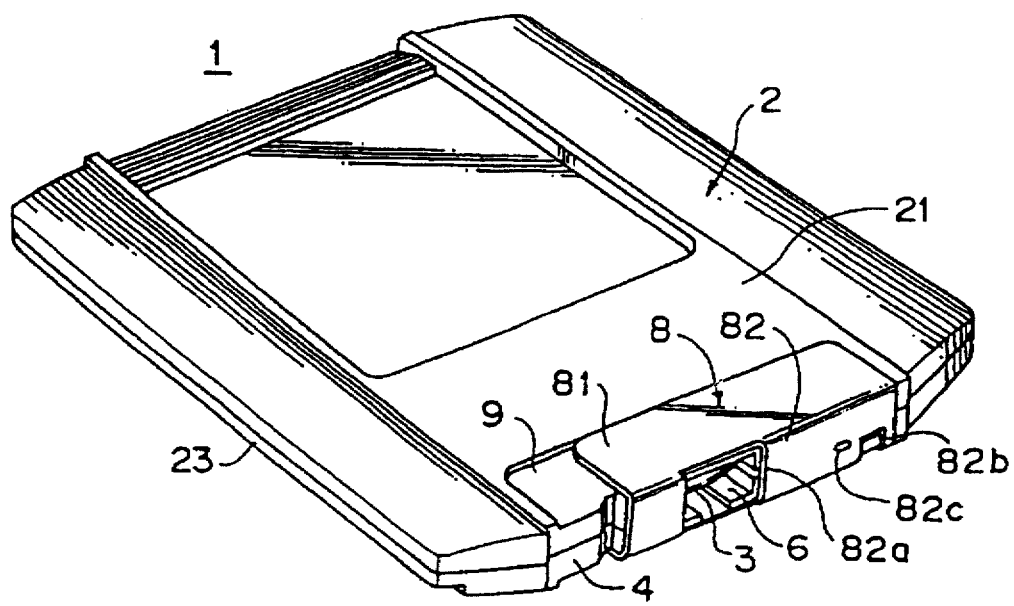
FIG. 3 is a top perspective view of the magnetic disk cartridge of FIG. 1 shown with its shutter member open.
Figure 4:
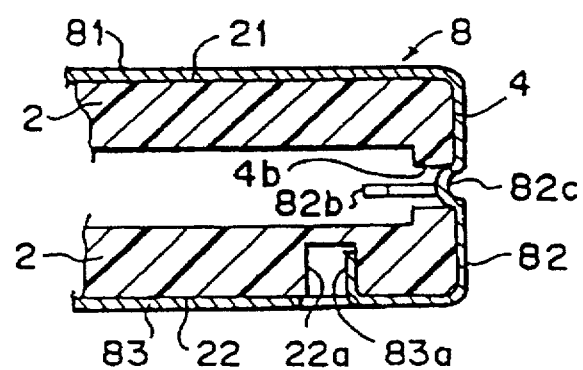
FIG. 4 is a sectional view of an essential portion of the magnetic disk cartridge of FIG. 1.
Figure 5:
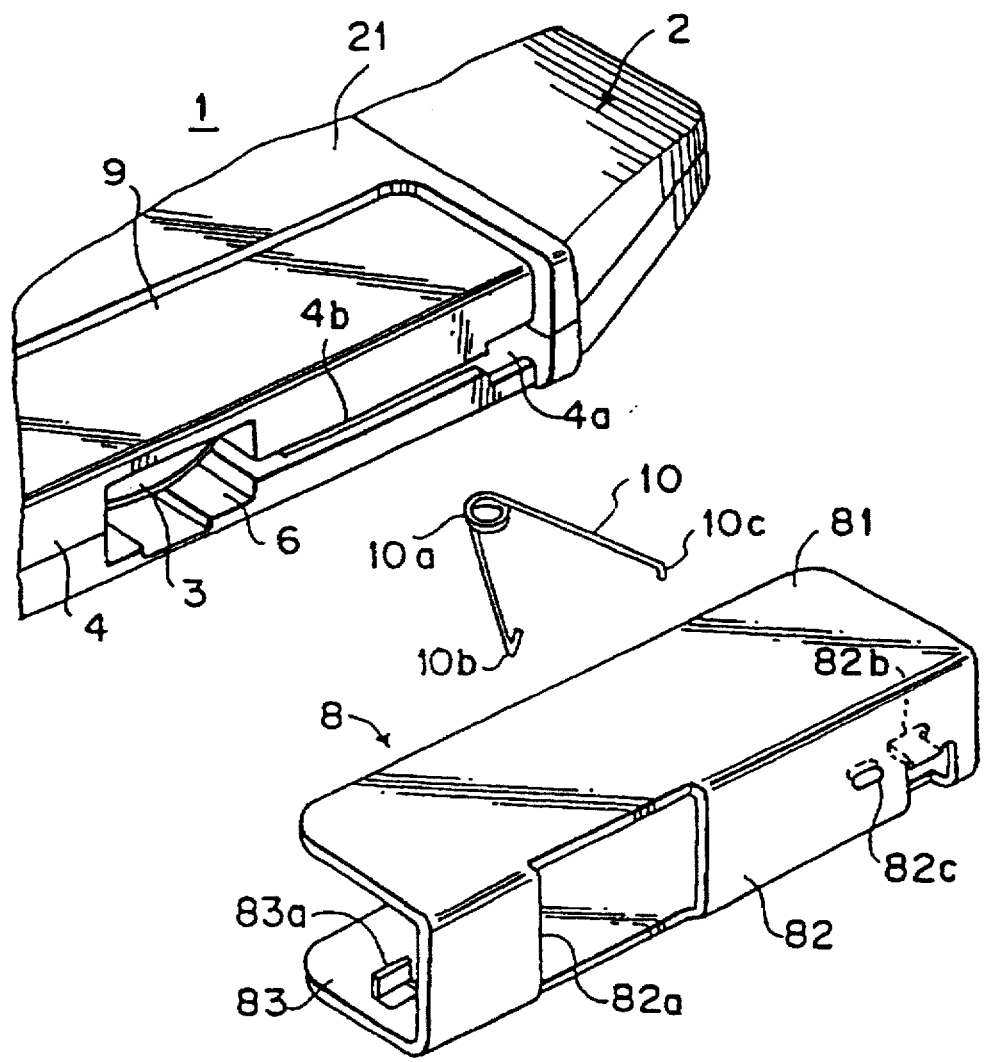
FIG. 5 is an exploded perspective view of the shutter portion of the magnetic disk cartridge of FIG. 1.

The magnetic disk cartridge of the present invention will hereinbelow be described with reference to the accompanying drawings. FIGS. 1 to 5 show a magnetic disk cartridge which is an embodiment of the invention. The magnetic disk cartridge is shown in perspective view from the top with its shutter member closed in FIG. 1, from the bottom with its shutter member closed in FIG. 2, and from the top with its shutter member open in FIG. 3. FIG. 4 is a sectional view of an essential portion of the magnetic disk cartridge and FIG. 5 is an exploded perspective view of the essential portion.

The magnetic disk cartridge 1 of this embodiment comprises a cassette shell 2 encasing a magnetic disk 3 so as to be freely rotatable therein. The cassette shell 2 is formed of a pair of top and bottom cassette shell halves made of molded plastic. The cassette shell 2 is formed substantially as a flat hexahedron having an approximately square top surface 21 slightly larger than a magnetic disk 3 encased therein, a bottom surface 22 of substantially the same shape as the top surface 21 and lying parallel thereto, and narrow side surfaces 23 extending between the outer peripheral edges of the top surface 21 and the bottom surface 22.

The center portion of the magnetic disk 3 (recording medium) is fixed to a rotating member 3a (center core). The rotating member 3a faces into a circular opening 2a in the bottom surface 22 of the cassette shell 2 (see FIG. 2). The rotating member 3a is adapted to be engaged by a spindle for rapidly rotating the magnetic disk 3.

A magnetic head access opening 6 enabling magnetic recording and reproducing heads to be brought in contact with, or close to, the opposite surfaces of the magnetic disk 3 from the exterior is formed in one side surface 4 among the four side surfaces 23 of the cassette shell 2.

A slidable shutter member 8 for opening and closing the magnetic head access opening 6 is provided on the cassette shell 2. The shutter member 8 is constituted as a sectionally U-shaped metal sheet member comprising, as interconnected, an upper wing 81 extending along the top surface 21, a shutter section 82 extending along the one side surface 4 and a lower wing 83 extending along the bottom surface 22. The shutter member 8 moves along these surfaces. The shutter section 82 is further provided with a shutter window 82a. It can therefore open and close the magnetic head access opening 6 depending on whether the magnetic disk cartridge 1 is in storage or operation.

On the other hand, portions of the top surface 21, the side surface 4 and the bottom surface 22 of the cassette shell 2 adjacent to the magnetic head access opening 6 are formed with a shallow recess 9 for retaining and guiding the upper wing 81, the shutter section 82 and the lower wing 83 of the shutter member 8. The upper wing 81, shutter section 82 and lower wing 83 of the shutter member 8 are received in and guided by the recess 9 to be slidable laterally along the surfaces of the cassette shell 2.

As shown in FIG. 5, the shutter member 8 is constantly biased in the direction of closing the magnetic head access opening 6 by a shutter closing spring 10. The shutter closing spring 10 is constituted as a torsion spring having a base portion 10a which is inserted into the cassette shell interior through a spring insertion opening 4a formed at one end portion of the side surface 4 of the cassette shell 2, a first end portion 10b which engages with a spring engaging portion 82b provided at a lateral end portion of the shutter section 82 of the shutter member 8, and a second end portion 10c which engages with the inner surface of the cassette shell.

The spring engaging portion 82b of the shutter member 8 is formed by cutting and bending inward a portion of the shutter section 82 so as to stand upright from the inner surface of the shutter section 82. In addition, a guide projection 82c is formed between the spring engaging portion 82b and the shutter window 82a (near the spring engaging portion 82b) to project inward.

The side surface 4 of the cassette shell 2 is formed approximately at its center portion with the magnetic head access opening 6 and at one side portion with the spring insertion opening 4a for insertion of the shutter closing spring 10. A groove-like slit 4b is formed in the side surface 4 to extend from the spring insertion opening 4a to the magnetic head access opening 6 in parallel with the top surface 21, i.e., in parallel with the sliding direction of the shutter member 8. The spring engaging portion 82b of the shutter member 8 passes through the slit 4b, as does the first end portion 10b of the shutter closing spring 10 engaged with the spring engaging portion 82b. In addition, the guide projection 82c engages with the portion of the side surface 4 at the slit 4b and by this engagement determines the position of the spring engaging portion 82b with respect to the width direction of the slit 4b so as to prevent the spring engaging portion 82b from making contact with the inner surfaces of the slit 4b.

In the illustrated example, the shape of the guide projection 82c in a section taken parallel to the shutter section 82 is elliptical (oval) with the longer axis extending in the longitudinal direction of the slit 4b. This shape increases the length of the engagement between the guide projection 82c and the slit 4b, thereby enhancing the positioning effect of the guide projection 82c. The positioning effect can also be increased by providing multiple guide projections 82c at an appropriate spacing and bringing them into engagement with the slit 4b.

The surface of the projecting portion of the guide projection 82c is rounded to facilitate engagement with the slit 4b. In light of the foregoing considerations, there is provided at least one guide projection 82c of circular, elliptical, rectangular or other such shape in a section taken parallel to the shutter section 82.

The lower wing 83 of the shutter member 8 is provided at two locations with projecting engagement pieces 83a, 83a (only one shown) and the bottom surface 22 of the cassette shell 2 is formed with a groove 22a extending in the sliding direction of the shutter member 8. The engagement pieces 83a engage with the groove 22a so as to prevent detachment of the shutter member 8.

The magnetic disk cartridge 1 of this embodiment is used in the same manner as the prior-art magnetic disk cartridge. Specifically, it is loaded into the magnetic recording and reproducing device (hereinafter called simply "device") in the state shown in FIG. 1, i.e. with the magnetic head access opening 6 closed by the shutter member 8. At this time, an operating member provided in the device responds to the loading operation by sliding the shutter member 8 to the open position shown in FIG. 3. Then, when the operator performs a prescribed operation for removing the magnetic disk cartridge 1 from the device, for instance, when the operator presses a prescribed operating button of the device, the shutter member 8 is closed to the position shown in FIG. 1.

Since the shutter member 8 of this embodiment is biased in the closing direction by the shutter closing spring 10 engaged with the spring engaging portion 82b of the shutter section 82, the magnetic head access opening 6 is closed and invasion of foreign matter is prevented when the magnetic disk cartridge is not in use. Moreover, the sliding of the shutter member 8 in the opening direction when the magnetic disk cartridge is inserted into the device is conducted with the guide projection 82c in engagement with the slit 4b. The spring engaging portion 82b engaged with the shutter closing spring 10 therefore moves along the slit 4b with its position in the width direction of the side surface 4 regulated by the guide projection 82c. As a result, the spring engaging portion 82b moves along the slit 4b without coming into contact with its inner surfaces even when the biasing force of the shutter closing spring 10 is unbalanced. Since the sliding of the shutter member 8 during opening and closing is therefore smooth and does not generate powder by abrasion of the cassette shell 2, damage to the magnetic heads by such powder does not occur and signal dropout is prevented.

Since various types of device side mechanisms are available for conducting the opening and closing operations of the shutter member 8 and such a mechanism can easily be constituted as in conventional devices, a detailed explanation of such a mechanism will not be given here.

In the embodiment described in the foregoing, the guide projection 82c of the shutter member 8 engages with the slit 4b formed in the cassette shell 2. Instead, it is possible to provide a groove extending in the sliding direction separately of the slit 4b and slidingly engage the guide projection 82c with this. In this case, the stability of the positioning can be increased by providing multiple grooves. Preferably, no gap should be allowed to form owing to separation of the inner surface of the shutter member 8 from the side surface 4 of the cassette shell 2.

Since the invention provides the magnetic head access opening of the magnetic disk cartridge in one side surface of the cassette shell, the magnetic head access opening can be made small to minimize invasion of dust and the like into the interior of the cartridge. In addition, the shutter member for opening and closing the magnetic head access opening, which is constituted as a sectionally U-shaped sheet member formed by interconnecting an upper wing, a shutter section and a lower wing that extend respectively along the top, one side and bottom surfaces of the cassette shell, is biased in the direction of closing the magnetic head access opening by the shutter closing spring engaged with the spring engaging portion of the shutter member and the sliding of the shutter member for opening and closing the magnetic head access opening is conducted with a guide projection provided between the spring engaging portion and the shutter window in contact with the side surface of the cassette shell so as to stabilize the attitude of the shutter member. This prevents local contact between the shutter member and the cassette shell during sliding in the opening and closing directions. As a result, damage to the magnetic heads by powder produced by sliding of the shutter member does not occur and signal dropout and the like are prevented. In addition, smooth sliding of the shutter member is ensured at all times despite the clearance between the shutter member and the cassette shell since play of the shutter member is regulated by the contact of the guide projection with the side surface of the cassette shell.

In the arrangement where the tip of the guide projection slides along a slit, moreover, the shutter section moves along the slit precisely parallel to the surface of the cassette shell so that the movement of the shutter member is further stabilized and abrasion of the cassette shell more reliably prevented.

What is claimed is:

1. A magnetic disk cartridge comprising:
   a magnetic disk,
   a cassette shell encasing the magnetic disk to be rotatable therein and formed as a flat prism with a top surface slightly larger than the magnetic disk, a bottom surface of substantially the same shape as the top surface and lying parallel thereto, and narrow side surfaces extending between outer peripheral edges of the top and bottom surfaces, wherein a slit including an inner surface, is formed in the one side surface of the cassette shell,
   a magnetic head access opening formed in one side surface for enabling magnetic recording and reproducing heads to be brought in contact with, or close to, opposite surfaces of the magnetic disk from the exterior, a shutter member constituted as a sectionally U-shaped sheet member formed by interconnecting an upper wing, a shutter section with a shutter window and a lower wing that extend respectively along said top, one side and bottom surfaces, a shutter closing spring for biasing the shutter member in the closing direction, said shutter closing spring having a first end portion and a second end portion, a spring engaging portion for engaging the first end portion of the shutter closing spring provided at the lateral end portion thereof of the shutter section of the shutter member, and a guide projection formed on the shutter member between the spring engaging portion and the shutter window and projecting toward the one side surface, wherein the shutter member is provided on the cassette shell to be slidable along said surfaces for enabling the shutter window of the shutter section to open and close the magnetic head access opening, and wherein the guide projection engages the slit at a portion of the one side surface of the cassette shell, and as the spring engaging portion moves along the slit, the guide projection regulates the position of the spring engaging portion with respect to the width direction of the slit, so as to prevent the spring engaging portion from making contact with the inner surface of the slit, even when the biasing force of the shutter closing spring is unbalanced.

2. A magnetic disk cartridge as defined in claim 1, further comprising a slit portion formed in the one side surface of the cassette shell for passage of the shutter closing spring or the spring engaging portion, the tip of the guide projection sliding in the slit portion.

3. A magnetic disk cartridge as defined in claim 2, wherein the guide projection has a circular, elliptical or rectangular shape as viewed in a section taken in a plane parallel to the one side surface of the cassette shell.

* * * * *